US008289658B2

(12) United States Patent
Huang et al.

(10) Patent No.: US 8,289,658 B2
(45) Date of Patent: Oct. 16, 2012

(54) ARM LIMITING SHOCK MOVEMENT

(75) Inventors: Yao-Hsin Huang, San Jose, CA (US);
Bill Wang, San Jose, CA (US); Seong Woo Kang, San Jose, CA (US)

(73) Assignee: Seagate Technology International

( * ) Notice: Subject to any disclaimer, the term of this patent is extended or adjusted under 35 U.S.C. 154(b) by 575 days.

(21) Appl. No.: 12/463,335

(22) Filed: May 8, 2009

(65) Prior Publication Data
US 2010/0284110 A1    Nov. 11, 2010

(51) Int. Cl.
*G11B 21/08*    (2006.01)

(52) U.S. Cl. ............... 360/265.1; 360/265.4; 360/265.9

(58) Field of Classification Search ............ 360/265.01, 360/256, 97.01, 265.1, 265.4, 265.9
See application file for complete search history.

(56) References Cited

U.S. PATENT DOCUMENTS

| 6,301,073 B1 * | 10/2001 | Gillis et al. ................ 360/97.01 |
| 2010/0284113 A1 * | 11/2010 | Ishii et al. ..................... 360/256 |

* cited by examiner

*Primary Examiner* — Huan Hoang

(57) ABSTRACT

This application discloses a hard disk drive comprising a arm limiter mounted on a disk base to limit movement of the actuator arms during a non-operational shock event while parked. The arm limiter and disk base are disclosed in various combinations to limit actuator arm movement during non-operational shocks.

15 Claims, 3 Drawing Sheets

Fig. 2A    Head stack assembly 48

ARM LIMITING SHOCK MOVEMENT

TECHNICAL FIELD

This invention relates to the arm limiter in a hard disk drive to minimize the effects of non-operational shocks particularly perpendicular to the disk base in both Load-UnLoad (LUL) and Contact Start Stop (CSS) hard disk drives.

BACKGROUND OF THE INVENTION

Landing ramps have been used for many years to park the sliders with their read-write heads when a Load-UnLoad (LUL) hard disk drive is not operational. Such systems may include a portable media player or notebook computer. Other hard disk drives, which have often been called Contact Start-Start (CSS) have tended to park the sliders on disk surfaces when not in operation. In both kinds of hard disk drives, there are situations in which a mechanical shock that is particularly strong perpendicular to the disk base can dislodge the parked sliders and damage the overall functionality of these hard disk drives.

SUMMARY OF THE INVENTION

Embodiments of the invention include a hard disk drive comprising a disk base, a spindle motor mounted on the disk base for rotating at least one disk to create at least one rotating disk surface, and a head stack assembly pivotably coupled to the disk base and including at least one actuator arm for positioning at least one head gimbal assembly with its slider over the rotating disk surface. The hard disk drive includes an arm limiter mounted to the disk base and including at least one finger configured to be near the actuator arm when the sliders are parked to limit actuator arm movement in response to a non-operational shock. As used herein, a non-operational shock refers to a mechanical shock experienced by the hard disk drive while its sliders are parked. The hard disk drive may be a Load-UnLoad (LUL) or a Contact Start-Stop (CSS) type of hard disk drive.

Various embodiments of the hard disk drive and the arm limiter may include more than one finger. The fingers may be variously configured so that a finger may between adjacent actuator arms, between an actuator arm and the disk base and/or near an actuator arm but facing away from the disk base. The disk base may include a mounting site for the arm limiter and may further include a finger zone to facilitate the finger between the actuator arm and the disk base.

Embodiments of the invention include a hard disk drive comprising a disk base, a spindle motor mounted on the disk base for rotating at least one disk to create at least one rotating disk surface, and a head stack assembly pivotably coupled to the disk base and including at least one actuator arm for positioning at least one head gimbal assembly with its slider over the rotating disk surface. The hard disk drive includes an arm limiter mounted to the disk base and including at least one finger configured to be near the actuator arm when the sliders are parked to limit actuator arm movement in response to a non-operational shock. As used herein, a non-operational shock refers to a mechanical shock experienced by the hard disk drive while its sliders are parked. The hard disk drive may be a Load-UnLoad (LUL) or a Contact Start-Stop (CSS) type of hard disk drive.

Figure 1:
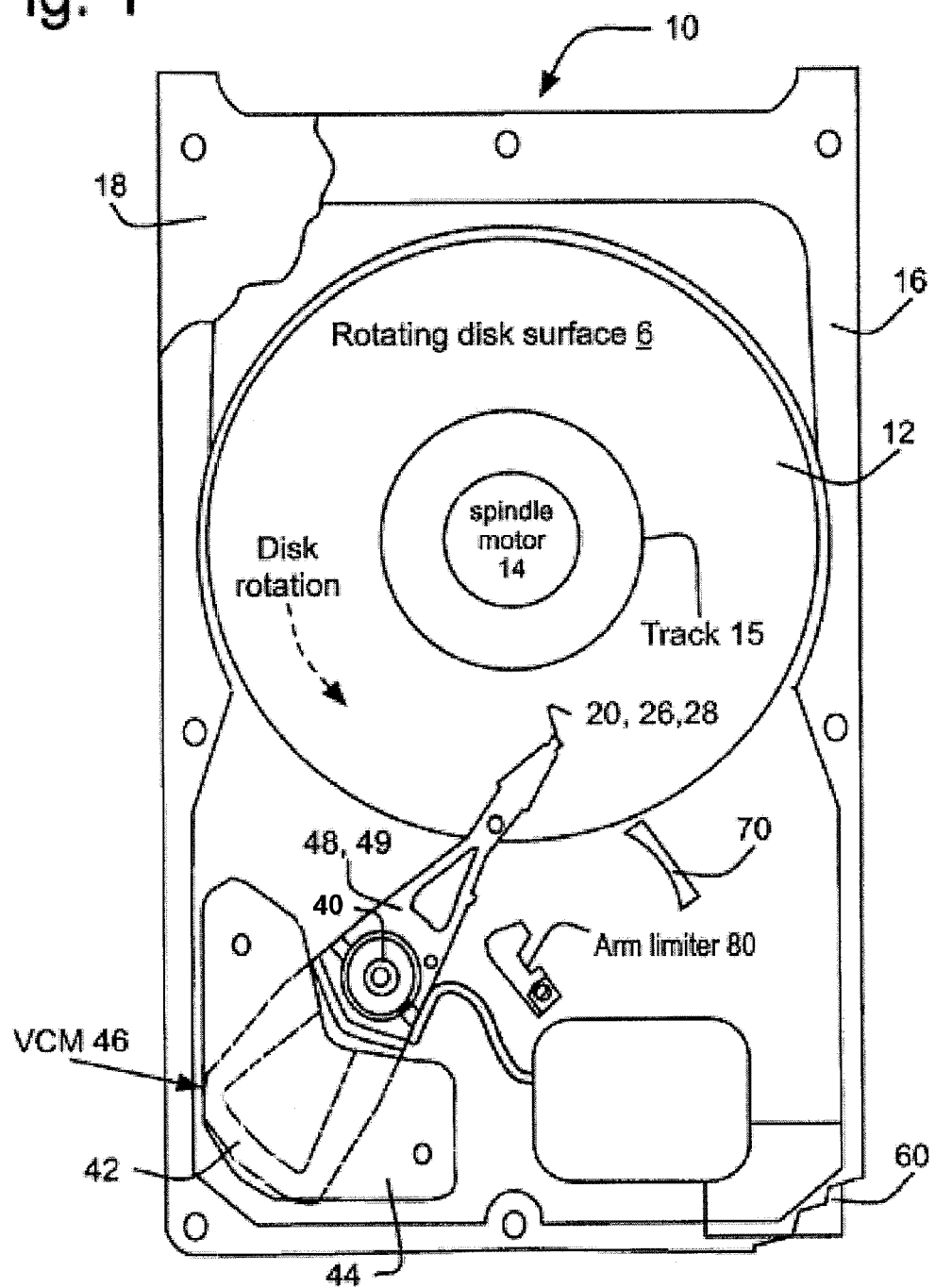
FIG. 1 shows an example of an embodiment of the invention as a hard disk drive including a disk base to which a spindle motor is mounted with at least one disk rotatably coupled to the spindle motor to create a rotating disk surface.

FIG. 2A shows a perspective view of the voice coil motor, its head stack assembly and the one or more head gimbal assemblies coupled to the one or more actuator arms of FIG. 1.

Figure 2B:
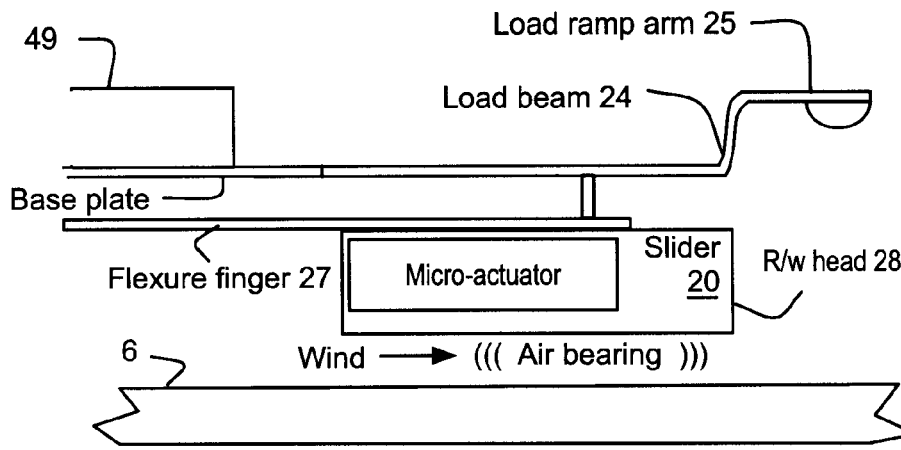
Figure 2B:
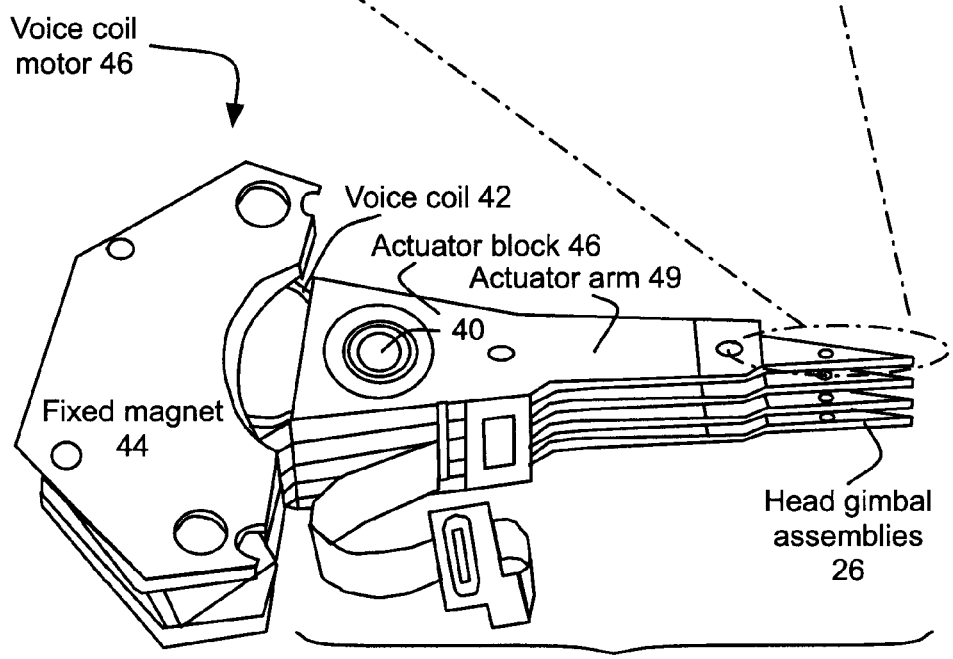

FIG. 2B shows a side view of some details of a head gimbal assembly of the previous Figures showing the head gimbal assembly coupled to an actuator arm by a base plate that couples to a load beam. A flexure finger may couple to the load beam and may support a slider containing a read-write head, which during access operations flies on an air bearing over the rotating disk surface. The load beam may include a loading ramp arm configured to engage the loading ramp to park the head gimbal assembly when not in access operations. Mechanical shocks to the hard disk drive when the sliders are parked will be referred to as non-operational shocks.

Figure 3:
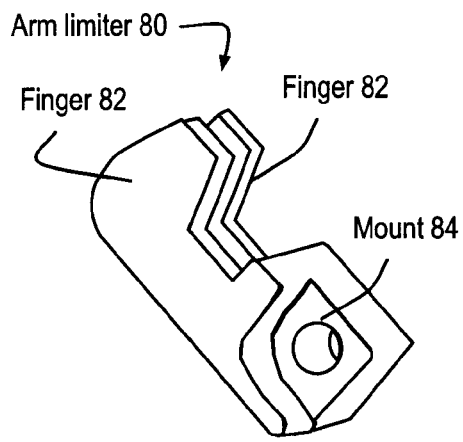

FIG. 3 shows a perspective view of the arm limiter of FIG. 1 including at least one, and in this example, two fingers both coupled to a mount used to couple the arm limiter to the disk base.

Figure 4:
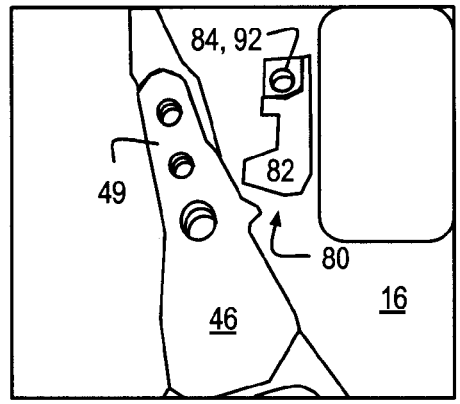
Figure 5:
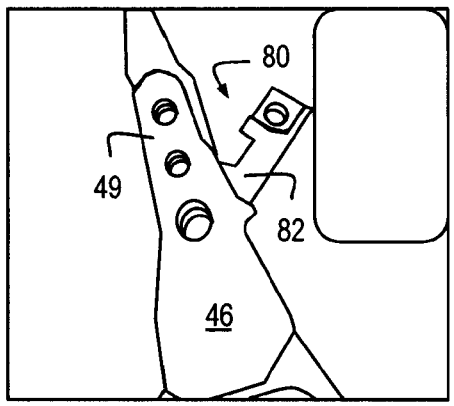
Figure 6:
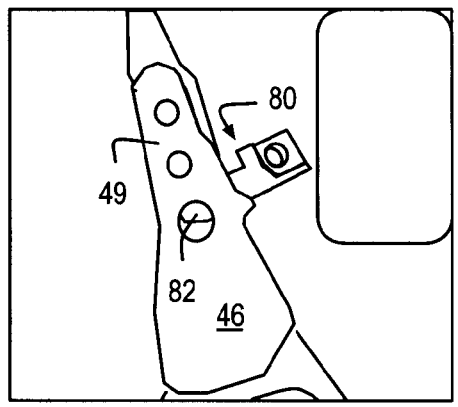

FIGS. 4 to 6 show a top view of assembling the hard disk drive, in particular mounting the arm limiter by its mount into a mounting site and positioning its fingers near the actuator arms.

Figure 7:
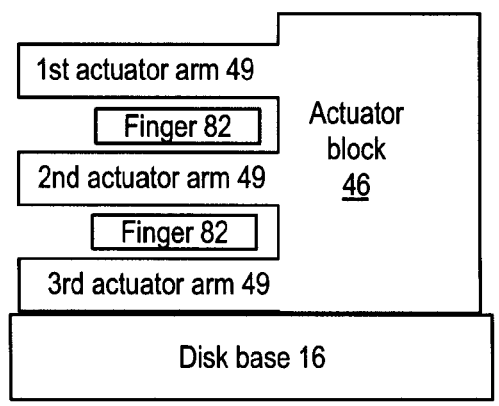

FIG. 7 shows an example of a cross section view of FIG. 6 showing the two fingers each between adjacent actuator arms.

Figure 8:
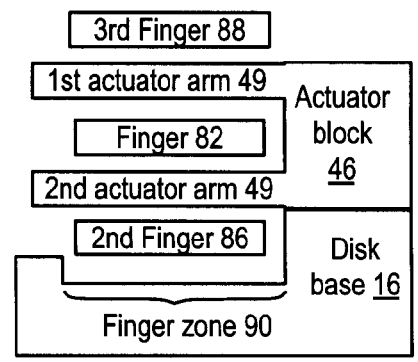

And FIG. 8 shows another example of a cross section view showing of the arm limiter including one finger between two actuator arms, a second finger between one of the actuator arms. and the disk base and a third finger near the first actuator arm facing away from the disk base, with the disk base possibly including a finger zone configured for the second finger to be situated between the second actuator arm and the disk base when the head stack assembly is parked.

DETAILED DESCRIPTION

This invention relates to the arm limiter in a hard disk drive to minimize the effects of non-operational shocks particularly perpendicular to the disk base in both Load-UnLoad (LUL) and Contact Start Stop (CSS) hard disk drives. Embodiments of the invention include a hard disk drive comprising a disk base, a spindle motor mounted on the disk base for rotating at least one disk to create at least one rotating disk surface, and a head stack assembly pivotably coupled to the disk base and including at least one actuator arm for positioning at least one head gimbal assembly with its slider over the rotating disk surface. The hard disk drive includes an arm limiter mounted to the disk base and including at least one finger configured to be near the actuator arm when the sliders are parked to limit actuator arm movement in response to a non-operational shock. As used herein, a non-operational shock refers to a mechanical shock experienced by the hard disk drive while its sliders are parked. The hard disk drive may be a Load-UnLoad (LUL) or a Contact Start-Stop (CSS) type of hard disk drive.

Referring to the drawings more particularly by reference numbers, FIG. 1 shows an example of an embodiment of the invention as a hard disk drive 10 including a disk base 16 to which a spindle motor 14 is mounted with at least one disk 12 rotatably coupled to the spindle motor to create a rotating disk surface 6. A voice coil motor 46 includes a head stack assembly 48 pivotably mounted by an actuator pivot 40 to the disk base, responsive to its voice coil 42 interacting with a fixed magnetic assembly 44 mounted on the disk base and including an actuator arm 49 coupled to a head gimbal assembly 26 and configured to position at least one slider 20 so that its read-write head 28 can access data stored in a track 15 on the rotating disk surface.

Mechanical shocks to the hard disk drive 10 when the sliders 20 are parked will be referred to as non-operational shocks.

An arm limiter 80 is mounted on the disk base 16 to limit actuator arm 49 effects from non-operational shocks operating perpendicular to the disk base, which can damage the read-write heads 28 of the sliders 20 during such shocks. In a Load-UnLoad (LUL) hard disk drive 10 as shown, a loader ramp 70 may mounted to the disk base either near the inside diameter of the disks 12 or near the outside diameter and configured to support the head gimbal assemblies 26 when the hard disk drive is non-operational. In a Contact Start-Stop (CSS) hard disk drive, the sliders are often parked on the surface of the disks, often near the shaft of the spindle motor 14. In such a CSS hard disk drive, the arm limiter may be positioned on the other side of the voice coil motor 46.

The hard disk drive 10 includes an assembled circuit board 60 also mounted on the disk base 16 opposite the spindle motor 14 and the voice coil motor 46. A disk cover 18 is mounted on the disk base to encapsulate all of the shown components except the assembled circuit board.

The hard disk drive 10 may access the data arranged in tracks 15 on the rotating disk surface 6 by controlling the spindle motor 14 to rotate the disks 12 at a specified rate. The data may be organized as tracks that may be configured as concentric circles or as a tightly packed spiral. The voice coil motor 46 operates by stimulating the voice coil 42 with a time varying electrical signal to magnetically interact with the fixed magnet assembly 44 causing the head stack assembly 48 to pivot about the actuator pivot 40 moving the head gimbal assembly 26 to position the slider 20 near the track on the rotating disk surface. In many embodiments, a micro-actuator assembly coupled to the slider may be further stimulated to further control the position of the slider. A vertical micro-actuator either in the micro-actuator assembly or in the slider, may be stimulated to alter the flying height of the slider over the rotating disk surface.

FIG. 2A shows a perspective view of the voice coil motor 46, its head stack assembly 48 and the one or more head gimbal assemblies 26 coupled to the one or more actuator arms 49 of FIG. 1. The head stack assembly is configured to pivot about the actuator pivot 40. Each of the actuator arms is coupled to an actuator block 46. Often the actuator arms and the actuator block are made from a single casting.

FIG. 2B shows a side view of some details of a head gimbal assembly 26 of the previous Figures showing the head gimbal assembly coupled to an actuator arm 49 by a base plate that couples to a load beam 24. A flexure finger 27 may couple to the load beam and may support a slider 20 containing the read-write head 28, which during access operations flies on an air bearing over the rotating disk surface 6. The load beam may include a loading ramp arm 25 configured to engage the loading ramp 70 of FIG. 1 to park the head gimbal assembly when not in access operations. Mechanical shocks to the hard disk drive when the sliders are parked on the loading ramp will be referred to as non-operational shocks.

In certain embodiments of the invention, there may be just one finger as shown in FIG. 6. Various embodiments of the hard disk drive 10 and the arm limiter 80 may include more than one finger 80 as shown in FIG. 3. A finger may between adjacent actuator arms 49 as shown in FIGS. 7 and 8. In other embodiments of the invention the finger 86 may between an actuator arm and the disk base as shown in FIG. 8. Also in FIG. 8, a finger 88 may be near an actuator arm but facing away from the disk base. The disk base 16 may include a mounting site 92 for the arm limiter as shown in FIG. 4 and may further include a finger zone 90 to facilitate the finger between the actuator arm and the disk base as shown in FIG. 8. The arm limiter may be composed of a plastic material with a high damping ratio. The plastic material may be made from a form of rubber or a manufactured hydro-carbon.

FIG. 3 shows a perspective view of the arm limiter 80 of FIG. 1 including at least one, and in this example, two fingers 82 both coupled to a mount 84 used to couple the arm limiter to the disk base 16.

FIGS. 4 to 6 show a top view of assembling the hard disk drive 10, in particular mounting the arm limiter 80 by its mount 84 into an mounting site 92 included in the disk base 16 and positioning its fingers 82 near the actuator arms 49 when the sliders are parked.

FIG. 7 shows an example of a cross section view of FIG. 6 showing the two fingers 82 each between adjacent actuator arms 49. The fingers 82 have a radial width that is less than the radial width of the actuator arms 49. When the actuator arms 49 are in a parked position the finger 82 is completely within the vertical profile of the actuator arms 49.

And FIG. 8 shows another example of a cross section view showing of the arm limiter 80 including one finger 82 between two actuator arms 49, a second finger 86 between one of the actuator arms and the disk base 16, and a third finger 88 near the first actuator arm facing away from the disk base, with the disk base possibly including a finger zone 90 configured for the second finger to be situated between the second actuator arm and the disk base when the head stack assembly 48 is parked.

The preceding embodiments provide examples of the invention, and are not meant to constrain the scope of the following claims.

What is claimed is:

1. An apparatus, comprising:
   a disk base;
   a spindle motor mounted on said disk base and coupled to at least one disk to create at least one rotating disk surface; and
   a head stack assembly pivotably mounted to said disk base to position through at least an actuator arm coupled to a slider over said rotating disk surface; and
   an arm limiter mounted to said disk base and comprising at least a finger, positioned near said actuator arm when parked, said finger having a radial width narrower than said actuator arm to limit shock movement acting through said actuator arm perpendicular to said disk base.

2. The apparatus of claim 1, wherein said arm limiter further comprises a second of said finger positioned between another of said actuator arm and said disk base when said actuator arm is parked to further limit said shock movement acting through said actuator arm perpendicular to said disk base.

3. The apparatus of claim 2, wherein said disk base includes a finger zone configured to accept said second of said finger between said one of said actuator arm and said disk base.

4. The apparatus of claim 1, wherein said head stack assembly includes at least two of said actuator arms; and
   wherein said arm limiter further comprises one of said finger positioned between two of said actuator arms that are adjacent.

5. The apparatus of claim 1, wherein said arm limiter further comprises a third of said finger positioned away from said disk base when said actuator arm is parked to further limit said shock movement acting through said actuator arm perpendicular to said disk base.

6. The apparatus of claim 1, wherein said arm limiter is composed of at least one plastic material with a high damping ratio.

7. The apparatus of claim 6, wherein said plastic material is a form of at least one member of the group consisting of a rubber and a manufactured plastic.

8. The apparatus of claim 1, wherein said hard disk drive employs a Contact Start Stop (CSS) parking of said head stack assembly.

9. The apparatus of claim 1, wherein said hard disk drive employs a LoadUnLoad (LUL) parking of said head stack assembly.

10. An apparatus, comprising:
a support base configured to mounted on a disk base of said hard disk drive; and
at least a finger configured to be positioned near an actuator arm in said hard disk drive when parked, said finger having a radial width narrower than said actuator arm to limit shock movement acting through said actuator arm perpendicular to said disk base.

11. The apparatus of claim 10, further comprising a second of said finger positioned between another of said actuator arm and said disk base when said actuator arm is parked to further limit said shock movement acting through said actuator arm perpendicular to said disk base.

12. The apparatus of claim 10, further comprising at least one of said finger positioned between a plurality of said actuator arm that are adjacent.

13. The apparatus of claim 10, further comprising a third of said finger positioned away from said disk base when said actuator arm is parked to further limit said shock movement acting through said actuator arm perpendicular to said disk base.

14. The apparatus of claim 10, wherein said arm limiter is composed of at least one plastic material with a high damping ratio.

15. The apparatus of claim 14, wherein said plastic material is a form of at least one member of the group consisting of a rubber and a manufactured plastic.

* * * * *